Aug. 6, 1957 A. DUERKSEN 2,801,443
ELECTRICALLY HEATED TIRE MOLD MATRIX
Filed Jan. 14, 1954 2 Sheets-Sheet 1
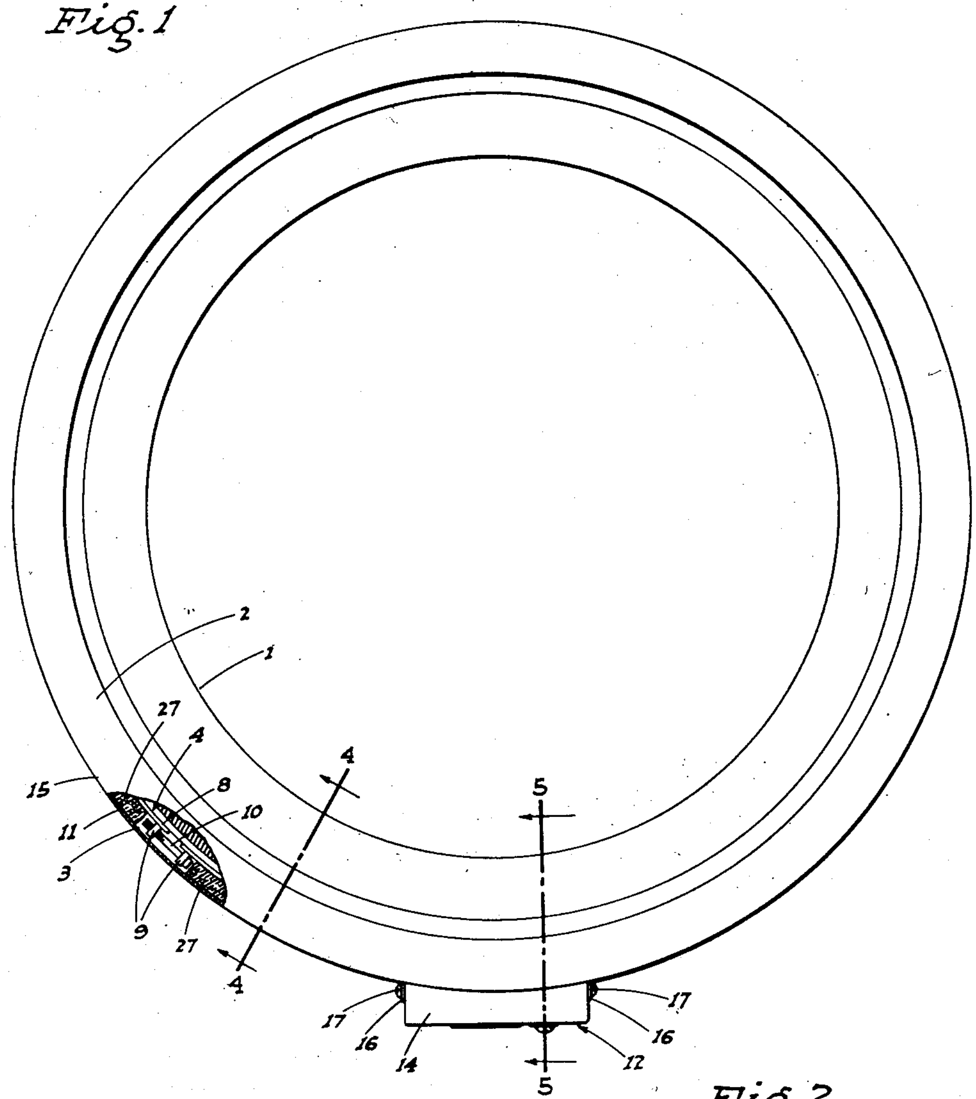
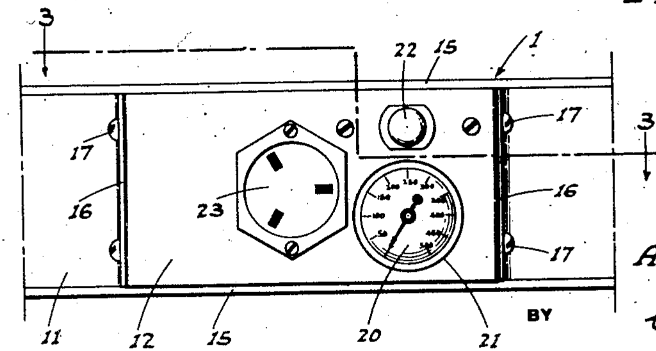
INVENTOR
Arnold Duerksen
BY
ATTORNEYS Aug. 6, 1957 A. DUERKSEN 2,801,443

ELECTRICALLY HEATED TIRE MOLD MATRIX

Filed Jan. 14, 1954 2 Sheets-Sheet 2

INVENTOR

Arnold Duerksen

BY Webster & Webster

ATTORNEYS

United States Patent Office 2,801,443

Patented Aug. 6, 1957

2,801,443

ELECTRICALLY HEATED TIRE MOLD MATRIX

Arnold Duerksen, Lodi, Calif., assignor to Super Mold Corporation of California, Lodi, Calif., a corporation of California Application January 14, 1954, Serial No. 404,074

2 Claims. (Cl. 18—18)

This invention relates to matrices, such as are used in tire treading molds, and particularly to one which is electrically heated; the main object being to provide a matrix of this type in which the electric heating element is so mounted in the matrix that it may be easily and quickly removed for replacement when necessary.

At the same time, the element—when in place—is so thoroughly heat-insulated from the outside air that great heating efficiency is obtained and only a minimum of power is required for the operation of the matrix at the desired temperature.

Still another object of the invention is to provide a tire mold matrix which is practical, reliable, and durable, and one which is exceedingly effective for the purpose for which it is designed.

These objects are accomplished by means of such structure and relative arrangement of parts as will fully appear by a perusal of the following specification and claims.

In the drawings:

Fig. 1 is a top plan view of the improved matrix, partly broken out and in section.

Fig. 2 is a fragmentary enlarged front elevation of the matrix.

Figure 3:
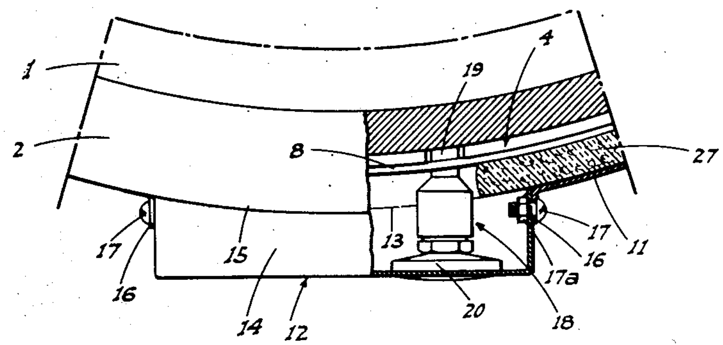
Fig. 3 is a fragmentary plan view, partly in section, substantially on line 3—3 of Fig. 2.
Figure 4:
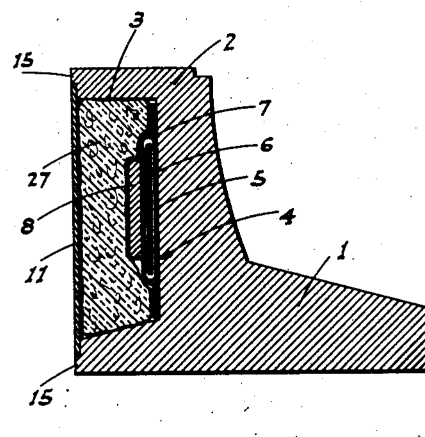
Fig. 4 is an enlarged cross section on line 4—4 of Fig. 1.
Figure 5:
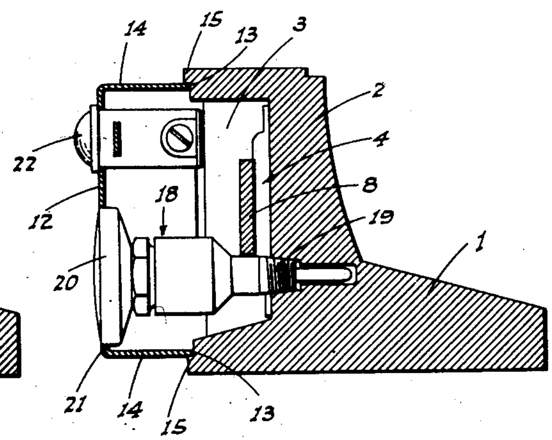
Fig. 5 is a similar view on line 5—5 of Fig. 1.

Referring now more particularly to the characters of reference on the drawings, each matrix half 1 is, as usual, a full-circle member, and in the present instance includes a radially thick outer portion 2 formed with a relatively large circumferential channel 3 open to the outer vertical periphery of the matrix.

The electric heating device is a circular separated-end unit 4 which comprises a narrow band 5 of a suitable resistance metal, which forms the heating element, and which is wrapped or wound about a thin strip 6 of flexible electrical-insulation or dielectric material.

This strip is enclosed within a flexible envelope 7 of the same or a similar dielectric material whose total height is substantially that of channel 3 at the bottom thereof, so that the heating unit may be disposed in the channel in engagement with said bottom.

The heating unit is removably retained in such position by a separated-end clamping band 8 which, adjacent its ends (see Fig. 1), is provided with outwardly projecting ears 9 connected by a detachable clamping bolt 10. Band 8 is disposed so that bolt 10 is circumferentially spaced some distance from the separated ends of the heating unit.

Band 8, together with ears 9 and bolt 10, are disposed within the confines of channel 3, which is closed by a removable separated-end metal band 11 and a relatively short outwardly projecting generally rectangular housing 12 which is disposed between the ends of band 11 and the edges 13 of the top and bottom faces 14 of which housing are curved to correspond to the curvature of the outer face of the matrix.

The opposed longitudinal edges of band 11, and the housing faces 14, are located in place relative to the matrix by overhanging shoulders or beads 15 formed circumferentially about the matrix.

In order to detachably connect the band 11 to the housing 12, said band, at its ends, is formed with outwardly projecting ears 16 which abut against the ends of the housing and are secured thereto by bolts 17; the nuts 17a of which are secured on the inside of the housing.

A heat indicating unit 18 is mounted in the matrix and comprises a stem 19 screwed in the matrix at the bottom of the channel 3 below clamping band 8 and between the ends of the heating unit, and an outer-end dial head 20 which removably projects through an opening 21 in the outer face of the housing 12.

By reason of this feature, the ends of the heating unit, to which the circuit wires are connected, are located in a definite relation to the housing 12 while allowing removal of the housing and the heating unit from the matrix without disturbing the unit 18.

Figure 6:
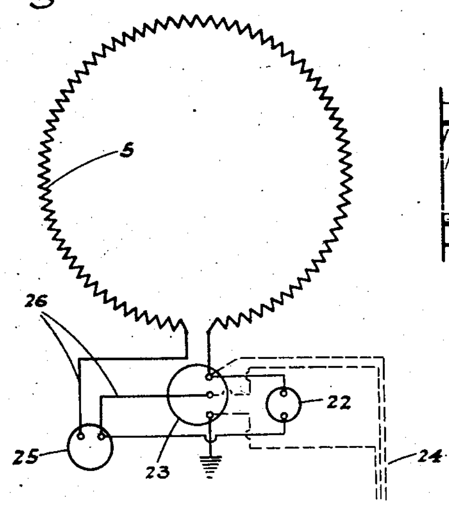
Fig. 6 is a diagram of the heating element and the circuit therefor mounted as a unit with the matrix.
Figure 7:
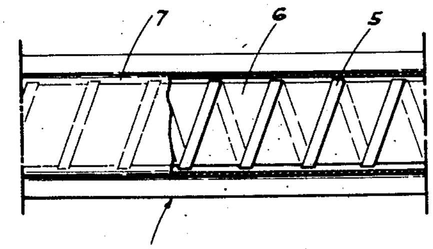
Fig. 7 is a fragmentary elevation of the specific heating element, with the enclosing envelope thereof partly broken away and in section.

A pilot light 22 is mounted in the front wall of the housing 12 above unit 18, while a socket 23—for connection to a three-lead current supply cord 24—is secured in said front wall; and a thermostat 25 in the housing is included in the circuit 26 between the socket 24 and the element 5 (see Fig. 6); the wires of circuit 26 being disposed within housing 12.

In order to heat-insulate the element 5 against heat dissipation in a radially outward direction, the space in the channel 3 between the heating unit 4 and the band 11 is mainly filled with segmental strips 27 of a suitable heat-insulating material of a flexible nature.

When it is desired to inspect or replace the heating unit, it is only necessary to unscrew the bolts 17, which allows the housing 12 to be drawn away from the matrix for disconnection of the circuit wires from the then exposed ends of the heating unit.

The band 11 may then be removed, which exposes the strips 27 for removal.

The clamping band 8 may then be withdrawn from about the heating unit 4 upon removal of bolt 10, which frees the heating unit for removal. The device 18 remaining in place, the heating unit and housing 12 (when replaced) will automatically be located in the proper position relative to each other.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An electrically heated matrix for a tire mold comprising a circular matrix body formed with a relatively large endless circumferential channel open to the outer periphery of the body, an electric heating unit removably disposed in the channel and extending substantially the full length thereof, heat insulating material removably mounted in the channel outwardly of the heating unit; and a retaining unit removably mounted on the matrix over the open face of the channel; said retaining unit comprising a separated-end band surrounding the matrix body over the open face of the channel for the major portion of the extent thereof, an outwardly projecting housing disposed between the ends of the band and enclosing the remaining portion of the channel, the housing supporting a plug-in socket electrically connected to the heating unit, and means securing the band at its ends to the ends of the housing; the band being detachable at one end at least from said housing.

2. A device as in claim 1, in which the band and housing are the same width and the matrix body is formed with peripheral shoulders overlapping the edges of the band and the opposed surfaces of the housing to locate and retain the band and housing against movement transversely of the matrix body.

References Cited in the file of this patent

UNITED STATES PATENTS

| | | |
|---|---|---|
| 2,014,332 | Houlette | Sept. 10, 1935 |
| 2,423,488 | Dowe | July 8, 1947 |
| 2,485,852 | Tebo | Oct. 25, 1949 |
| 2,498,950 | Fowler | Feb. 28, 1950 |
| 2,545,653 | Desloge | Mar. 20, 1951 |
| 2,599,433 | Cohen | June 3, 1952 |